(12) United States Patent
Ogawa et al.

(10) Patent No.: US 8,394,501 B2
(45) Date of Patent: Mar. 12, 2013

(54) POLYURETHANE RESIN COMPOSITION

(75) Inventors: Shun Ogawa, Kanagawa (JP); Hisayuki Kuwahara, Kanagawa (JP); Takeshi Koyama, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 413 days.

(21) Appl. No.: 12/669,578

(22) PCT Filed: Jul. 24, 2008

(86) PCT No.: PCT/JP2008/063238
§ 371 (c)(1),
(2), (4) Date: Jan. 19, 2010

(87) PCT Pub. No.: WO2009/014162
PCT Pub. Date: Jan. 29, 2009

(65) Prior Publication Data
US 2010/0189937 A1    Jul. 29, 2010

(30) Foreign Application Priority Data

Jul. 24, 2007  (JP) ................................. 2007-192077

(51) Int. Cl.
*B32B 15/095*   (2006.01)
*B32B 18/72*    (2006.01)
*B32B 27/06*    (2006.01)
*B32B 1/02*     (2006.01)
*C08G 18/72*    (2006.01)

(52) U.S. Cl. ............... 428/425.5; 428/425.8; 428/425.9; 428/35.2; 528/65

(58) Field of Classification Search ............... 428/35.2, 428/423.1, 425.5, 425.8, 425.9; 528/65
See application file for complete search history.

(56) References Cited

U.S. PATENT DOCUMENTS

| | | | |
|---|---|---|---|
| 3,663,513 A | | 5/1972 | Kazama et al. |
| 4,761,212 A | * | 8/1988 | Watanabe et al. ............. 204/488 |
| 6,569,533 B1 | | 5/2003 | Uchida et al. |
| 6,887,966 B2 | * | 5/2005 | Nomura et al. ................ 528/78 |
| 7,534,493 B2 | * | 5/2009 | Nomura et al. ............ 428/423.1 |
| 2003/0207122 A1 | | 11/2003 | Uchida et al. |
| 2003/0229194 A1 | | 12/2003 | Nomura et al. |
| 2004/0185266 A1 | | 9/2004 | Nomura et al. |
| 2005/0084686 A1 | | 4/2005 | Imaizumi |
| 2007/0003768 A1 | * | 1/2007 | Nomura et al. ............ 428/423.1 |

FOREIGN PATENT DOCUMENTS

| | | |
|---|---|---|
| EP | 0 327 038 | 8/1989 |
| EP | 0 327 039 | 8/1989 |
| EP | 1 369 443 A2 | 12/2003 |
| EP | 1 443 067 A1 | 8/2004 |
| EP | 1 524 110 A2 | 4/2005 |
| JP | 7 91367 | 10/1995 |
| JP | 7 91368 | 10/1995 |
| JP | 9 77089 | 3/1997 |
| JP | 9 314735 | 12/1997 |
| JP | 10 34821 | 2/1998 |
| JP | 2001 98047 | 4/2001 |
| JP | 2002 256208 | 9/2002 |
| JP | 2004 10655 | 1/2004 |
| JP | 2004 10656 | 1/2004 |
| JP | 2004 027014 | 1/2004 |
| JP | 2004 231730 | 8/2004 |
| JP | 2004 231731 | 8/2004 |

* cited by examiner

*Primary Examiner* — Thao T. Tran
(74) *Attorney, Agent, or Firm* — Oblon, Spivak, McClelland, Maier & Neustadt, L.L.P.

(57) ABSTRACT

The present invention provides a polyurethane resin composition containing an active hydrogen compound (A) formed by adding m-xylylene diisocyanate and/or hexamethylene diisocyanate to a specific compound (C) at a reaction equivalent ratio ([the number of isocyanate groups]/[the number of hydroxyl groups]) of 0.80 to 0.10; and an organic polyisocyanate compound (B) formed by adding a specific compound (D) to m-xylylene diisocyanate and/or hexamethylene diisocyanate at a reaction equivalent ratio ([the number of isocyanate groups]/[the number of hydroxyl groups]) of 2 to 10; an adhesive and a coating material containing the resin composition; and a multi-layer film and a packaging bag containing any of these.

22 Claims, No Drawings

POLYURETHANE RESIN COMPOSITION

TECHNICAL FIELD

The present invention relates to a polyurethane resin composition which is suitable for use as a packaging material for, for example, foods or drugs for the purpose of preserving contents thereof by preventing penetration therethrough by various gases (e.g., oxygen, water vapor, and aroma components); to an adhesive or coating material containing the resin composition; and to a multi-layer film containing such an adhesive or coating material.

BACKGROUND ART

In recent years, plastic films or sheets, or molded products thereof have generally been used as packaging materials for the purpose of preserving contents, from the viewpoints of, for example, transparency, light weight, and cost. Plastic films used for packaging foods, drugs, cosmetics, etc., are required to exhibit, for example, gas-barrier property to various gases, transparency, resistance to retort treatment, flexion resistance, flexibility, and heat sealability. Particularly, such a film is required to exhibit high gas-barrier property to oxygen and water vapor, from the viewpoint of maintaining the properties and characteristics of contents which are packaged by the film.

In general, thermoplastic plastic films exhibit only a moderate level of gas-barrier property. Therefore, hitherto, coating of such a film with a polyvinylidene chloride (PVDC) resin has generally been carried out as a technique for imparting gas-barrier property to the film. However, a PVDC-coated film produced through this technique poses a problem in that when the film, which contains halogen atoms, is incinerated, toxic substances (e.g., dioxins) are generated, which may cause environmental destruction.

As alternatives to such a PVDC-coated film, there have been disclosed, for example, the following films: a film formed of a saponification product of ethylene-vinyl acetate copolymer (EVOH resin), a polyvinyl alcohol (PVA)-coated film, an inorganic vapor-deposited film formed by depositing silica, alumina, or the like on a flexible polymer film, and a metal-foil-laminated film. However, such an EVOH resin film or PVA-coated film poses a problem in that water permeates the film under high-humidity conditions, and when the film is subjected to boiling or retort treatment, the oxygen-barrier property thereof is considerably deteriorated. Also, such an inorganic vapor-deposited film or metal-foil-laminated film, in which a gas-barrier layer is formed through deposition of a hard inorganic compound or formed of a metal, poses a problem in that cracks or pinholes are generated in the gas-barrier layer through flexion, resulting in considerable deterioration of gas-barrier property. In addition, such a deposited film requires a large-scale production apparatus (e.g., a vacuum deposition apparatus), as compared with the case of a coating film or a laminate film, and poses a problem in terms of production cost.

There have been disclosed a method for improving impact resistance or resistance to pinhole formation of an inorganic vapor-deposited film or a metal-foil-laminated film. Specifically, there has been proposed an aluminum-foil-containing pouch formed of a layered film including a thermoplastic resin film and an aluminum foil, wherein nylon films are stacked on both sides of the aluminum foil (see Patent Document 1). Also, there has been proposed a layered film exhibiting good impact resistance and resistance to pinhole formation, the film including a first layer (stretched nylon film), a second layer (metal foil), a third layer (coextrusion film including two LLDPE or LDPE layers and a nylon layer sandwiched therebetween), and a fourth layer (LLDPE film or LDPE film) (see Patent Document 2). Also, there has been proposed a layered film for packaging electronic parts, which film exhibits good moisture-proof property, resistance to pinhole formation, poking resistance, and antistatic property, and which includes an antistatic layer, a biaxially oriented polyethylene terephthalate layer, an aluminum foil layer, a biaxially oriented nylon layer, and an antistatic polyolefin layer, the layers being stacked in this order, wherein a gas-barrier layer formed of an aluminum-deposited layer, an aluminum-oxide-deposited layer, a silicon-oxide-deposited layer, and a vinylidene chloride resin layer is provided between the biaxially oriented polyethylene terephthalate layer and the biaxially oriented nylon layer (see Patent Document 3). Any of these means makes an attempt to improve impact resistance or resistance to pinhole formation by devising a layer structure, but requires a complicated layer structure (i.e., requires an intricate production process).

In connection with a coating technique for improving resistance to pinhole formation of an inorganic vapor-deposited film or a metal-foil-laminated film, there have been proposed a polyurethane resin exhibiting gas-barrier property and a gas-barrier film containing the resin (see Patent Document 4), and a coated film exhibiting gas-barrier property (see Patent Document 5). However, these do not necessarily satisfy both interfilm adhesion and gas-barrier property.

Meanwhile, there has been proposed a method for improving the gas-barrier property (to oxygen, carbon dioxide, etc.) of a composition containing an epoxy resin by increasing the amine nitrogen content of the composition (see Patent Documents 6 and 7). However, such a composition for coating materials neither has considerably high gas-barrier property nor exhibits high gas-barrier property under high-humidity conditions. Therefore, demand has arisen for further improvement in gas-barrier property.

Also, there has been proposed an epoxy resin composition exhibiting high gas-barrier property, which contains an epoxy resin having a specific structure, and an amine-containing curing agent (see Patent Document 8). However, the aforementioned epoxy resin composition is unsatisfactory in terms of short pot life and poor workability, although the composition exhibits good gas-barrier property, adhesion, and chemical resistance.

Patent Document 1: Japanese Patent Application Laid-Open (kokai) No. H09-77089
Patent Document 2: Japanese Patent Application Laid-Open (kokai) No. H09-314735
Patent Document 3: Japanese Patent Application Laid-Open (kokai) No. H10-34821
Patent Document 4: Japanese Patent Application Laid-Open (kokai) No. 2001-98047
Patent Document 5: Japanese Patent Application Laid-Open (kokai) No. 2004-231730
Patent Document 6: Japanese Patent Publication (kokoku) No. H07-91367
Patent Document 7: Japanese Patent Publication (kokoku) No. H07-91368
Patent Document 8: Japanese Patent Application Laid-Open (kokai) No. 2002-256208

DISCLOSURE OF THE INVENTION

Problems to be Solved by the Invention

The present invention contemplates provision of a polyurethane resin composition which can prevent generation of cracks or pinholes in a gas-barrier layer through flexion treatment, and which enables an inorganic vapor-deposited film or a metal-foil-laminated film to retain high gas-barrier property even after flexion treatment; an adhesive containing the resin composition; a coating material containing the resin composition; a multi-layer film containing the resin composition; and a packaging bag containing the multi-layer film.

The present invention also contemplates provision of a polyurethane resin composition exhibiting high gas-barrier property, exhibiting excellent adhesion to various polymers, paper, metals, etc., and exhibiting excellent resistance to contents packaged by a film formed from the resin composition (hereinafter the resistance may be referred to as "content resistance"); an adhesive containing the resin composition; a multi-layer film containing the adhesive; and a packaging bag containing the multi-layer film.

Means for Solving the Problems

The present inventors have found that:

(1) when an adhesive layer or coating layer formed from a polyurethane resin having a specific composition is provided on a deposition layer of an inorganic vapor-deposited film or on a metal foil layer of a metal-foil-laminated film, the resultant non-halogen-containing multi-layer film exhibits excellent properties (e.g., gas-barrier property and flexion resistance);

(2) an adhesive formed of a polyurethane resin having a specific composition exhibits high gas-barrier property, excellent adhesion to various polymers, paper, metals, etc., and excellent content resistance; and (3) a polyurethane resin composition having a specific composition and containing a specific metal element can maintain high gas-barrier property and high adhesion strength over a long period of time, and an excellent coating material or adhesive can be produced from the polyurethane resin composition. The present invention has been accomplished on the basis of these findings.

The present invention provides:

(1) a polyurethane resin composition comprising an active hydrogen compound (A) formed by adding m-xylylene diisocyanate and/or hexamethylene diisocyanate to a compound (C) at a ratio of the number of isocyanate groups to that of hydroxyl groups (hereinafter the ratio may be referred to as "reaction equivalent ratio") of 0.80 to 0.10; and an organic polyisocyanate compound (B) formed by adding a compound (D) to m-xylylene diisocyanate and/or hexamethylene diisocyanate at a reaction equivalent ratio ([the number of isocyanate groups]/[the number of hydroxyl groups]) of 2 to 10, wherein the compound (C) is at least one compound selected from among ethylene glycol, 1,3-propanediol, propylene glycol, diethylene glycol, dipropylene glycol, m-xylylene glycol, trimethylolpropane, glycerin, an ethylene oxide adduct of aniline, a propylene oxide adduct of aniline, an ethylene oxide adduct of m-xylylenediamine, and a propylene oxide adduct of m-xylylenediamine; and the compound (D) is at least one compound selected from among ethylene glycol, 1,3-propanediol, propylene glycol, diethylene glycol, dipropylene glycol, m-xylylene glycol, trimethylolpropane, glycerin, an ethylene oxide adduct of aniline, a propylene oxide adduct of aniline, an ethylene oxide adduct of m-xylylenediamine, and a propylene oxide adduct of m-xylylenediamine (hereinafter the polyurethane resin composition may be referred to as "the present invention");

(2) a polyurethane resin composition according to (1) above, wherein the active hydrogen compound (A) is an active hydrogen compound formed by adding m-xylylene diisocyanate and/or hexamethylene diisocyanate to the compound (C) at a reaction equivalent ratio ([the number of isocyanate groups]/[the number of hydroxyl groups]) of 0.75 to 0.10 (hereinafter the polyurethane resin composition may be referred to as "the first invention");

(3) a polyurethane resin composition according to (1) above, wherein the active hydrogen compound (A) is an active hydrogen compound formed by adding m-xylylene diisocyanate to the compound (C) at a reaction equivalent ratio ([the number of isocyanate groups]/[the number of hydroxyl groups]) of 0.80 to 0.35; and the organic polyisocyanate compound (B) is an organic polyisocyanate formed by adding the compound (D) to m-xylylene diisocyanate at a reaction equivalent ratio ([the number of isocyanate groups]/[the number of hydroxyl groups]) of 2 to 10 (hereinafter the polyurethane resin composition may be referred to as "the second invention");

(4) a resin composition according to (3) above, which contains at least one metal element selected from the group consisting of transition metals belonging to Groups 8, 9, and 10 of the periodic table (long-period type), manganese, copper, and zinc (hereinafter the resin composition may be referred to as "the third invention");

(5) a polyurethane adhesive containing a resin composition as recited in any of (1) to (4) above;

(6) a polyurethane coating material containing a resin composition as recited in any of (1) to (4) above;

(7) a multi-layer film having a cured product layer formed from a resin composition as recited in any of (1) to (4) above; and (8) a packaging bag characterized by being produced by overlapping multi-layer films as recited in (7) above so that sealant layers thereof face each other, and heat-sealing peripheral edge portions of the thus-overlapped films, thereby forming a sealed portion.

Effects of the Invention

The polyurethane resin composition of the present invention realizes provision of an adhesive or coating material exhibiting high gas-barrier property and excellent properties (e.g., interlayer adhesion, gas-barrier property under high-humidity conditions, and flexion resistance); a multi-layer film formed through stacking of an inorganic vapor-deposited layer and a sealant layer by use of the adhesive; and a coated film formed through application of the coating material to an inorganic vapor-deposited film.

According to the present invention, there can be provided an adhesive exhibiting high gas-barrier property and suitable adhesion to various polymers, paper, metals, etc.; a gas-barrier multi-layer film containing the adhesive; and a packaging bag containing the multi-layer film.

A characteristic feature of the adhesive of the present invention resides in that it exhibits suitable adhesion to various film materials and high gas-barrier property. Therefore, application of the adhesive to a single layer can provide the layer with both gas-barrier property and adhesion.

BEST MODES FOR CARRYING OUT THE INVENTION

The present invention will next be described in detail.
[Polyurethane Resin Composition]

The polyurethane resin composition of the present invention contains an active hydrogen compound (A) and an organic isocyanate compound (B). The resin composition can be employed as an adhesive or a coating material for producing a multi-layer film such as a laminate film or a coated film.

The active hydrogen compound (A) and the organic isocyanate compound (B) will next be described.

Active Hydrogen Compound (A)

In the present invention, the active hydrogen compound (A) is formed by adding m-xylylene diisocyanate and/or hexamethylene diisocyanate to the below-described compound (C).

The compound (C) is at least one compound selected from among ethylene glycol, 1,3-propanediol, propylene glycol, diethylene glycol, dipropylene glycol, m-xylylene glycol, trimethylolpropane, glycerin, an ethylene oxide adduct of aniline, a propylene oxide adduct of aniline, an ethylene oxide adduct of m-xylylenediamine, and a propylene oxide adduct of m-xylylenediamine. These compounds (C) may be employed singly or in combination of two or more species.

In the first invention, m-xylylene diisocyanate or hexamethylene diisocyanate may be employed singly, or they may be employed in combination. In the second or third invention, only m-xylylene diisocyanate is employed.

When the compound (C) is an alkylene oxide adduct of an amino compound (e.g., an ethylene oxide adduct of aniline, a propylene oxide adduct of aniline, an ethylene oxide adduct of m-xylylenediamine, or a propylene oxide adduct of m-xylylenediamine), the ratio of the number of alkylene oxide compound molecules to that of amino groups (i.e., the reaction equivalent ratio of the alkylene oxide compound to the amino compound) is preferably 2 to 8, more preferably 2 to 4, from the viewpoint of achievement of high gas-barrier property.

When the compound (C) employed is any of the aforementioned compounds, high adhesion, gas-barrier property, flexion resistance, and content resistance can be attained. From the viewpoints of, for example, solubility of the resultant active hydrogen compound (A) in a solvent, and compatibility of the compound (A) with the organic polyisocyanate compound (B), the ratio of the number of hydroxyl groups originating from propylene glycol, dipropylene glycol, trimethylolpropane, an ethylene oxide adduct of aniline, a propylene oxide adduct of aniline, and a propylene oxide adduct of m-xylylenediamine to the number of all the hydroxyl groups of the compound (C) is preferably 50% or more, more preferably 60% or more, still more preferably 70% or more, much more preferably 80% or more, particularly preferably 90% or more.

In the first invention, the ratio by hydroxyl equivalent of a compound(s) having three or more functionalities to the compound (C) is preferably less than 70%, more preferably less than 60%, particularly preferably less than 50%, from the viewpoints of, for example, solubility of the resultant active hydrogen compound (A) in a solvent, as well as adhesion, to a base, of an adhesive or coating material containing the active hydrogen compound (A). In the second or third invention, the ratio by hydroxyl equivalent of a compound(s) having three or more functionalities to the compound (C) is preferably 5% or more and less than 70%, more preferably 10% or more and less than 60%, much more preferably 20% or more and less than 50%.

In the present invention, even when the reaction equivalent ratio of m-xylylene diisocyanate and/or hexamethylene diisocyanate to the compound (C) (i.e., [the number of isocyanate groups]/[the number of hydroxyl groups]) is any value, high gas-barrier property and flexion resistance can be attained. However, the reaction equivalent ratio is 0.80 to 0.10, from the viewpoints of solubility of the resultant active hydrogen compound (A) in a solvent, adhesion, to a base, of an adhesive or coating material containing the active hydrogen compound (A), content resistance, and pot life.

In the first invention, the aforementioned reaction equivalent ratio is preferably 0.75 to 0.10, more preferably 0.70 to 0.20, particularly preferably 0.67 to 0.25, from the viewpoints of solubility of the resultant active hydrogen compound (A) in a solvent, adhesion, to a base, of an adhesive or coating material containing the active hydrogen compound (A), and pot life.

In the second or third invention, the aforementioned reaction equivalent ratio is preferably 0.80 to 0.35, more preferably 0.75 to 0.40, particularly preferably 0.70 to 0.50, from the viewpoints of solubility of the resultant active hydrogen compound (A) in a solvent, adhesion, to a base, of an adhesive containing the active hydrogen compound (A), content resistance, and pot life.

In the present invention, a conventionally known method may be employed for adding m-xylylene diisocyanate and/or hexamethylene diisocyanate to the compound (C). For example, the compound (C) is added to a reaction apparatus in such an amount that the number of hydroxyl groups thereof exceeds the number of isocyanate groups of m-xylylene diisocyanate and/or hexamethylene diisocyanate added, and m-xylylene diisocyanate and/or hexamethylene diisocyanate is added dropwise to the reaction apparatus, followed by heating, to thereby allow reaction to proceed. An organic solvent may optionally be employed during reaction. Examples of the organic solvent include toluene, xylene, ethyl acetate, butyl acetate, acetone, methyl ethyl ketone, methyl isobutyl ketone, tetrahydrofuran, dimethylformamide, and dimethylacetamide. These organic solvents may be employed singly or in combination of two or more species. Also, a reaction accelerator may optionally be employed during reaction. Examples of the reaction accelerator which may be employed include known organometallic compounds (lead or tin compounds) and tertiary amines.

The compound (C) may be further added to a compound produced through the aforementioned method (i.e., a reaction product produced through addition of m-xylylene diisocyanate to the compound (C)), at a reaction equivalent ratio of m-xylylene diisocyanate to the compound (C) falling within the aforementioned range.

Organic Polyisocyanate Compound (B)

In the first invention, the organic polyisocyanate compound (B) is an organic polyisocyanate formed by adding the compound (D) to m-xylylene diisocyanate and/or hexamethylene diisocyanate. In the second or third invention, the organic polyisocyanate compound (B) is an organic polyisocyanate formed by adding the compound (D) to m-xylylene diisocyanate.

The compound (D) is at least one compound selected from among ethylene glycol, 1,3-propanediol, propylene glycol, diethylene glycol, dipropylene glycol, m-xylylene glycol, trimethylolpropane, glycerin, an ethylene oxide adduct of aniline, a propylene oxide adduct of aniline, an ethylene oxide adduct of m-xylylenediamine, and a propylene oxide adduct of m-xylylenediamine. These compounds (D) may be employed singly or in combination of two or more species.

In the first invention, m-xylylene diisocyanate or hexamethylene diisocyanate may be employed singly, or they may be employed in combination. In the second or third invention, only m-xylylene diisocyanate is employed.

When the compound (D) is an alkylene oxide adduct of an amino compound (e.g., an ethylene oxide adduct of aniline, a propylene oxide adduct of aniline, an ethylene oxide adduct of m-xylylenediamine, or a propylene oxide adduct of m-xylylenediamine), the ratio of the number of alkylene oxide compound molecules to that of amino groups (i.e., the reaction equivalent ratio of the alkylene oxide compound to the amino compound) is preferably 2 to 8, more preferably 2 to 4, from the viewpoint of achievement of high gas-barrier property.

When the compound (D) employed is any of the aforementioned compounds, high gas-barrier property can be attained. From the viewpoints of, for example, solubility of the resultant organic polyisocyanate compound (B) in a solvent, as well as adhesion, to a base, of an adhesive or coating material containing the organic polyisocyanate compound (B), in the first or second invention, the ratio of the number of hydroxyl groups of a compound(s) having three or more functionalities to that of all the hydroxyl groups of the compound (D) is preferably less than 80%, more preferably less than 70%, particularly preferably less than 60%. In the third invention, the ratio of the number of hydroxyl groups of a compound(s) having three or more functionalities to that of all the hydroxyl groups of the compound (D) is preferably 5% or more and less than 80%, more preferably 10% or more and less than 70%, particularly preferably 20% or more and less than 60%. When the aforementioned ratio is 5% or more and less than 80%, reliable adhesion can be maintained over a long period of time.

In the first invention, even when the reaction equivalent ratio of m-xylylene diisocyanate and/or hexamethylene diisocyanate to the compound (D) (i.e., [the number of isocyanate groups]/[the number of hydroxyl groups]) is any value, high gas-barrier property and flexion resistance can be attained. However, the reaction equivalent ratio is preferably 2 to 10, more preferably 2.5 to 8, most preferably 3 to 6, from the viewpoints of solubility of the resultant organic polyisocyanate compound (B) in a solvent, adhesion, to a base, of an adhesive or coating material containing the organic polyisocyanate compound (B), and pot life.

In the second or third invention, the active hydrogen compound (A) is formed by adding m-xylylene diisocyanate to the compound (C) at a reaction equivalent ratio ([the number of isocyanate groups]/[the number of hydroxyl groups]) of 0.80 to 0.35, and the organic polyisocyanate compound (B) is formed by adding the compound (D) to m-xylylene diisocyanate preferably at a reaction equivalent ratio ([the number of isocyanate groups]/[the number of hydroxyl groups]) of 2 to 10 (more preferably 2.5 to 8, most preferably 3 to 6), from the viewpoints of high gas-barrier property, flexion resistance, solubility of the resultant organic polyisocyanate compound (B) in a solvent, adhesion, to a base, of an adhesive containing the organic polyisocyanate compound (B), content resistance, and pot life.

In the present invention, a conventionally known reaction method may be employed for producing the organic polyisocyanate compound (B). For example, m-xylylene diisocyanate and/or hexamethylene diisocyanate is added to a reaction apparatus in such an amount that the number of isocyanate groups thereof exceeds the hydroxyl equivalent of the compound (D), and the compound (D) is added dropwise to the reaction apparatus, followed by heating, to thereby allow reaction to proceed. An organic solvent may optionally be employed during reaction. Examples of the organic solvent include toluene, xylene, ethyl acetate, butyl acetate, acetone, methyl ethyl ketone, methyl isobutyl ketone, tetrahydrofuran, dimethylformamide, and dimethylacetamide. These organic solvents may be employed singly or in combination of two or more species. Also, a reaction accelerator may optionally be employed during reaction. Examples of the reaction accelerator which may be employed include known organometallic compounds (lead or tin compounds) and tertiary amines.

When unreacted polyisocyanate compound is present in the resultant reaction product, the polyisocyanate compound may be removed therefrom through a conventional method (thin film evaporation or extraction).

Polyurethane Resin Composition

In the polyurethane resin composition of the present invention, even when the ratio of the amount of the organic polyisocyanate compound (B) to that of the active hydrogen compound (A) ([the number of isocyanate groups]/[the number of hydroxyl groups]) is any value, high gas-barrier property and flexion strength can be attained. However, from the viewpoints of adhesion of the polyurethane resin composition to a base, and the appearance of a coated film or laminate film containing the polyurethane resin composition, the aforementioned ratio is preferably 0.7 to 2.0, more preferably 0.8 to 1.7, most preferably 0.9 to 1.5.

The polyurethane resin composition of the present invention begins to cure through mixing of the active hydrogen compound (A) and the organic polyisocyanate compound (B). Therefore, preferably, the polyurethane resin composition is of a two-component type in which the active hydrogen compound (A) and the organic polyisocyanate compound (B) are separately stored, and these compounds are mixed together upon use. Each of the active hydrogen compound (A) and the organic polyisocyanate compound (B) may contain a solvent employed during production thereof. Alternatively, an organic solvent may be further added to each of these compounds. Examples of the organic solvent which may be added include aromatic hydrocarbons such as toluene and xylene; ketones such as acetone, methyl ethyl ketone, and methyl isobutyl ketone; ethers such as tetrahydrofuran and dioxane; esters such as ethyl acetate and butyl acetate; nitriles such as acetonitrile; and amides such as dimethylformamide and dimethylacetamide. These solvents may be employed in combination of two or more species.

In the third invention, the polyurethane resin composition contains at least one metal element selected from the group consisting of transition metals belonging to Groups 8, 9, and 10 of the periodic table (long-period type), manganese, copper, and zinc. The transition metal element contained in the urethane resin composition of the present invention—which is one or more metal elements selected from among transition metals belonging to Groups 8, 9, and 10 of the periodic table, manganese, copper, and zinc—promotes oxidation reaction of a methylene-containing skeletal structure adjacent to an arenediyl group, so as to attain an oxygen-absorbing function. Conceivably, oxidation reaction promoted by such a metal element occurs by the action of promoting the following reactions: generation of radicals resulting from removal of hydrogen atoms from methylene chains adjacent to an arenediyl group; generation of peroxy radicals through addition of oxygen molecules to the aforementioned radicals; and removal of hydrogen atoms by the peroxy radicals.

The transition metal element employed in the present invention is preferably a transition metal belonging to Group 8 of the periodic table (e.g., iron or ruthenium), a transition metal belonging to Group 9 (e.g., cobalt or rhodium), a transition metal belonging to Group 10 (e.g., nickel or palladium), manganese, copper, or zinc, from the viewpoint of oxygen-absorbing performance. Of these, iron, cobalt, rhodium, zinc, copper, or manganese is preferred, with cobalt being particularly preferred.

The transition metal element is employed in the form of an inorganic acid salt, organic acid salt, or complex salt of any of the aforementioned metals. Examples of the inorganic acid salt include halides such as chloride and bromide, sulfate, nitrate, phosphate, and silicate. Examples of the organic salt include carboxylate, sulfonate, and phosphonate. The transition metal element employed may be in the form of a complex with, for example, a β-diketone or a β-keto ester. Particularly, the present invention preferably employs a carboxylate salt, a halide, or an acetylacetonato complex containing any of the aforementioned transition metal elements, from the viewpoints of oxygen-absorbing function and good compatibility with the urethane resin composition. More preferred is an acetate, naphthenate, oleate, or acetylacetonato complex containing any of the aforementioned transition metal elements. In the urethane resin composition of the present invention, the aforementioned transition metal compounds may be employed singly or in combination of two or more species.

The urethane resin composition of the present invention preferably contains any of the aforementioned metal elements in an amount of 10 to 5,000 ppm, more preferably 50 to 4,000 ppm, much more preferably 200 to 3,000 ppm. When the metal element concentration of the urethane resin composition is 10 to 5,000 ppm, the composition exhibits good oxygen-absorbing performance, and long pot life.

No particular limitation is imposed on the method for adding a metal to the polyurethane resin composition. The metal may be added to the active hydrogen compound (A) or the organic polyisocyanate compound (B). Alternatively, the metal may be added upon mixing of the active hydrogen compound (A) with the organic polyisocyanate compound (B). However, preferably, the metal is added to the active hydrogen compound (A), or added upon mixing of the compound (A) with the compound (B).

In the present invention, when an adhesive containing the aforementioned urethane resin composition (polyurethane adhesive) or a coating material containing the composition (polyurethane coating material) is applied or laminated to a film material (e.g., inorganic vapor-deposited film) serving as a base, a humectant may be added to the resin composition for promoting moistening of the surface of the base. Examples of the humectant include silicone and acrylic compounds. Specific examples of the humectant include BYK331, BYK333, BYK340, BYK347, BYK348, BYK354, BYK380, and BYK381, which are available from BYK-Chemie. When such a humectant is added to the urethane resin composition, the amount of the humectant is preferably 0.01 to 2.0 wt. % on the basis of the total weight of the resin composition.

The aforementioned urethane resin composition may also contain an inorganic filler such as silica, alumina, mica, talc, aluminum flakes, or glass flakes, so as to improve properties (e.g., gas-barrier property, impact resistance, and heat resistance) of the aforementioned adhesive or coating material. From the viewpoint of transparency of the resultant laminate film or coated film, preferably, a transparent inorganic filler is employed. When such an inorganic filler is added to the urethane resin composition, the amount of the filler is preferably 0.01 to 10 wt. % on the basis of the total weight of the resin composition.

The aforementioned urethane resin composition may optionally contain a tackifier such as a xylene resin, a terpene resin, a phenolic resin, or a rosin resin, so as to improve the tackiness of the aforementioned adhesive or coating material to various materials immediately after application thereof. When such a tackifier is added to the urethane resin composition, the amount of the tackifier is preferably 0.01 to 5 wt. % on the basis of the total weight of the resin composition.

The aforementioned urethane resin composition may optionally contain a compound exhibiting an oxygen-capturing function. Examples of the compound exhibiting an oxygen-capturing function include low-molecular-weight compounds capable of reacting with oxygen, such as hindered phenols, vitamin C, vitamin E, organophosphorus compounds, gallic acid, and pyrogallol.

The aforementioned urethane resin composition may also contain a coupling agent such as a silane coupling agent or a titanium coupling agent, so as to improve the adhesion of the aforementioned adhesive or coating material. When such a coupling agent is added to the urethane resin composition, the amount of the coupling agent is preferably 0.01 to 5.0 wt. % on the basis of the total weight of the resin composition.

[Multi-Layer Film]

The multi-layer film of the present invention includes a cured product layer formed from the aforementioned polyurethane resin composition. No particular limitation is imposed on the layer structure of the multi-layer film, and the multi-layer film is, for example, a laminate film employing the resin composition as an adhesive, or a coated film employing the resin composition as a coating material. The multi-layer film may include therein an inorganic vapor-deposited layer or a metal foil. The resin composition may be applied as a coating material to an inorganic vapor-deposited layer or a metal foil, or a film may be adhered to the inorganic vapor-deposited layer or the metal foil by use of the resin composition serving as an adhesive, to thereby provide a structure in which a cured product layer formed from the resin composition is in contact with the inorganic vapor-deposited layer or the metal foil.

Multi-Layer Film Including Inorganic Vapor-Deposited Layer or Metal Foil Layer and Exhibiting Excellent Flexion Resistance When a cured product layer formed from the composition of the present invention is provided on an inorganic vapor-deposited layer or a metal foil layer, to thereby form a multi-layer film, the resultant multi-layer film can maintain high gas-barrier property even after having undergone flexion treatment. Among the compositions of the present invention, particularly, the composition of the first invention is preferably applied to such a multi-layer film. No particular limitation is imposed on the layer structure of the multi-layer film, so long as the film includes the aforementioned inorganic vapor-deposited layer or metal foil layer, and the cured product layer. The multi-layer film may be, for example, a laminate film employing the urethane resin composition as an adhesive, or a coated film employing the resin composition as a coating material. For example, the urethane resin composition is applied as a coating material to a base formed of an inorganic vapor-deposited film or a metal foil, and then the coating material is cured, to thereby produce a coated film including an inorganic vapor-deposited layer and a cured product layer. Also, a sealant film or another resin film is stacked on a base formed of an inorganic vapor-deposited film or a metal foil by use of the urethane resin composition serving as an adhesive, and then the adhesive is cured, to thereby produce a laminate film including an inorganic vapor-deposited layer or a metal foil layer, and a cured product layer. Alternatively, an inorganic vapor-deposited film having a sealant layer (inorganic vapor-deposited sealant film) may be stacked on a non-inorganic vapor-deposited base film. The multi-layer film of the present invention preferably has a structure in which an inorganic vapor-deposited layer or a metal foil layer is in contact with a cured product layer. The aforementioned inorganic vapor-deposited layer is preferably formed from at least one species selected from among aluminum, alumina, and silica. The aforementioned metal foil is preferably aluminum foil.

Examples of the layer structure of the multi-layer film include:

(1) a coated film formed of at least an inorganic vapor-deposited film and the aforementioned cured product layer;

(2) a laminate film formed of at least an inorganic vapor-deposited film, the aforementioned cured product layer, and a sealant film;

(3) a laminate film formed of at least a base film, the aforementioned cured product layer, and an inorganic vapor-deposited sealant film;

(4) a coated film formed of at least a metal foil and the aforementioned cured product layer; and (5) a laminate film formed of at least a metal foil, the aforementioned cured product layer, and a sealant film.

No particular limitation is imposed on the inorganic vapor-deposited film employed as a base, so long as it can retain the aforementioned adhesive or coating material. Examples of the inorganic vapor-deposited film which may be employed include aluminum-deposited polyester film, aluminum-deposited polyamide film, aluminum-deposited polyolefin film, alumina-deposited polyester film, alumina-deposited polyamide film, alumina-deposited polyolefin film, silica-deposited polyester film, silica-deposited polyamide film, silica-deposited polyolefin film, alumina-silica-binary-deposited polyester film, and alumina-silica-binary-deposited polyolefin film. Of these, preferred are aluminum-deposited polyester film, aluminum-deposited polyolefin film, alumina-deposited polyester film, alumina-deposited polyamide film, silica-deposited polyester film, silica-deposited polyamide film, alumina-silica-binary-deposited polyester film, and alumina-silica-binary-deposited polyamide film.

Such a film may be uniaxially or biaxially oriented. The thickness thereof is about 10 to about 300 μm, preferably about 10 to about 200 μm, from the viewpoint of practical use.

No particular limitation is imposed on the non-inorganic vapor-deposited base film employed as a base, so long as it can retain the aforementioned adhesive or coating material. Examples of the non-inorganic vapor-deposited base film which may be employed include films formed of polyolefins (e.g., polyethylene and polypropylene), films formed of polyesters (e.g., polyethylene terephthalate and polyethylene naphthalate), films formed of polyamides (e.g., nylon 6 and nylon 6,6), polyacrylic films, polystyrene films, EVOH films, and PVA films. Such a film may be uniaxially or biaxially oriented. The thickness thereof is about 10 to about 300 μm, preferably about 10 to about 200 μm, from the viewpoint of practical use.

No particular limitation is imposed on the metal foil employed, but the thickness thereof is preferably about 3 to about 15 μm. When the thickness is less than 3 μm, the metal foil itself exhibits extremely reduced flexion resistance, resulting in insufficient effect of improving flexion resistance in the present invention, whereas when the thickness exceeds 15 μm, the metal foil itself exhibits improved flexion resistance, resulting in reduced necessity for improvement of flexion resistance in the present invention. The metal foil employed is generally aluminum foil. In a metal-foil-laminated polymer film, in which the metal foil is supported on a thermoplastic polymer, the metal foil is generally employed in one layer of the layered film, but may be employed in two or more layers of the layered film.

No particular limitation is imposed on the inorganic vapor-deposited sealant film employed as a sealant layer, so long as it can retain the aforementioned adhesive or coating material, and exhibits good heat sealability. Examples of the inorganic vapor-deposited sealant film which may be employed include aluminum-deposited polyethylene film and aluminum-deposited polypropylene film. The thickness of such a film is about 10 to about 300 μm, preferably about 10 to about 200 μm, from the viewpoint of practical use.

No particular limitation is imposed on the non-inorganic vapor-deposited sealant film employed as a sealant layer, so long as it can retain the aforementioned adhesive or coating material, and exhibits good heat sealability. Examples of the non-inorganic vapor-deposited sealant film which may be employed include polyethylene film, polypropylene film, and ethylene-vinyl acetate copolymer film. The thickness of such a film is about 10 to about 300 μm, preferably about 10 to about 200 μm, from the viewpoint of practical use.

Multi-Layer Film Including Cured Product Layer Exhibiting High Gas-Barrier Property In a multi-layer film (e.g., laminate film) employing, as an adhesive, the resin composition of the present invention (in particular, the composition of the second or third invention), a cured product layer exhibits high gas-barrier property.

Examples of the film material which may be laminated with the adhesive include films formed of polyolefins (e.g., low-density polyethylene, high-density polyethylene, linear low-density polyethylene, and polypropylene), films formed of polyesters (e.g., polyethylene terephthalate and polybutylene terephthalate), films formed of polyamides (e.g., nylon 6, nylon 6.6, and m-xyleneadipamide (N-MXD6)), polyacrylonitrile films, poly(meth)acrylic films, polystyrene films, polycarbonate films, saponified ethylene-vinyl acetate copolymer (EVOH) films, polyvinyl alcohol films, papers (e.g., carton paper), metal foils (e.g., aluminum foil and copper foil), films formed by coating such a film material with various polymers (e.g., polyvinylidene chloride (PVDC) resin, polyvinyl alcohol resin, saponified ethylene-vinyl acetate copolymer resin, and acrylic resin), films having thereon a deposited inorganic compound or metal (e.g., silica, alumina, or aluminum), films in which an inorganic filler, etc., are dispersed, and films provided with an oxygen-capturing function.

The polymer employed for coating a film may contain an inorganic filler dispersed therein. Examples of the inorganic filler include silica, alumina, mica, talc, aluminum flakes, and glass flakes. Preferably, a phyllosilicate such as montmorillonite is employed. Such an inorganic filler may be dispersed in a polymer through a conventionally known technique such as extrusion-kneading or mixing-dispersion in a resin solution. For imparting an oxygen-capturing function to a film, a composition containing, for example, a low-molecular-weight organic compound capable of reacting with oxygen (e.g., a hindered phenol compound, vitamin C, vitamin E, an organophosphorus compound, gallic acid, or pyrogallol) or a transition metal (e.g., cobalt, manganese, nickel, iron, or copper) compound may be employed in at least a portion of the film.

The thickness of such a film material is about 10 to about 300 μm, preferably about 10 to about 100 μm, from the viewpoint of practical use. When a plastic film is employed, the film may be uniaxially or biaxially oriented.

Preferably, the surface of such a film material is optionally subjected to a surface treatment (e.g., flame treatment or corona discharge treatment), so that an adhesive layer having no defect (e.g., breakage and crawling) is formed on the film material. Such a treatment can promote good adhesion of an adhesive layer to the thus-treated film material. Optionally, a printed layer may be provided on the film material whose surface has undergone an appropriate surface treatment. Provision of such a printed layer may be carried out by means of a printing apparatus which has generally been used for printing on conventional polymer films, such as a gravure printing machine, a flexographic printing machine, or an offset printing machine. The ink employed for forming a printed layer may be an ink which has been used for forming printed layers on conventional polymer films and which contains, for example, a pigment (e.g., an azo pigment or a phthalocyanine pigment), a resin (e.g., rosin, polyamide rein, or polyurethane), and a solvent (e.g., methanol, ethyl acetate, or methyl ethyl ketone).

Among the aforementioned film materials, preferably, a polyolefin film (e.g., polyethylene film, polypropylene film, or ethylene-vinyl acetate copolymer film) is selected for forming a flexible polymer film layer serving as a sealant layer, from the viewpoint of achievement of good heat sealability. The thickness of such a film is about 10 to about 300 μm, preferably about 10 to about 100 μm, from the viewpoint of practical use. The surface of such a film may be subjected to a surface treatment (e.g., flame treatment or corona discharge treatment).

In the present invention, a primer layer may be formed on a surface of a base to which an adhesive is applied. In such a case, whether the adhesive is of one-component type or two-component type, no particular limitation is imposed on the chemical structure of the primer employed, so long as the primer can come into close contact with the base. The thickness of such a primer layer is 0.01 to 20 μm, preferably 0.1 to 5 μm, from the viewpoint of practical use. When the thickness is less than 0.01 μm, the primer layer is difficult to come into close contact with the base sufficiently, whereas when the thickness exceeds 20 μm, the thus-formed primer layer is difficult to have a uniform thickness.

The aforementioned multi-layer film may be produced by stacking, for example, an outer layer formed from a thermoplastic resin, and a thermoplastic resin layer exhibiting heat sealability. When the respective layers forming the multi-layer film are stacked, at least one adhesive layer is adhered to the corresponding layer by use of an adhesive predominantly containing the aforementioned urethane resin composition. An adhesive layer other than the adhesive layer employing the aforementioned adhesive may be adhered to the corresponding layer by use of another adhesive or through welding of resins.

No particular limitation is imposed on the layer structure of the aforementioned multi-layer film, so long as the film includes at least one barrier layer formed from the aforementioned urethane resin cured product. A layer(s) other than the barrier layer may be formed from any of the aforementioned materials employed for forming a base. Examples of the layer structure include, but are not limited to, three-layer structures (each including an adhesive layer formed from the urethane resin composition), such as polyolefin/urethane resin composition/polyolefin and polyamide/urethane resin composition/polyolefin.

Method for Producing Laminate Film

Any known lamination technique, such as dry lamination, non-solvent lamination, or extrusion lamination may be employed for lamination of a film material by use of the adhesive containing the urethane resin composition of the present invention, to thereby produce a laminate film. In the present invention, dry lamination is preferably employed.

When the aforementioned adhesive is applied or laminated to a film material, the concentration and temperature of the urethane resin composition are determined so that an adhesive layer (cured product layer) is satisfactorily formed. These conditions may vary with selection of the starting materials and lamination process employed. Specifically, the urethane resin composition concentration may vary with the types and proportions by mole of selected materials, the lamination method employed, etc., so as to correspond to, for example, the case where no solvent is employed, or the case where the composition is diluted with an appropriate organic solvent to a concentration of about 5 wt. %, thereby preparing a coating liquid. No particular limitation is imposed on the organic solvent employed, so long as it exhibits solubility in the adhesive. Examples of the organic solvent which may be employed include aromatic hydrocarbons such as toluene and xylene; ketones such as acetone, methyl ethyl ketone, and methyl isobutyl ketone; ethers such as tetrahydrofuran and dioxane; esters such as ethyl acetate and butyl acetate; nitriles such as acetonitrile; and amides such as dimethylformamide and dimethylacetamide. These organic solvents may be employed singly or in combination of two or more species.

An antifoaming agent may be added to a coating liquid upon preparation of the liquid from the aforementioned adhesive for preventing foaming of the liquid. Examples of the antifoaming agent include silicone and acrylic compounds. Specific examples include BYK019, BYK052, BYK065, BYK066N, BYK067N, BYK070, and BYK080, which are available from BYK-Chemie. When such an antifoaming agent is added, the amount thereof is preferably 0.01 to 3.0 wt. %, more preferably 0.02 to 2.0 wt. %, on the basis of the total weight of the urethane resin composition contained in the adhesive.

When a solvent is employed, the temperature at which the solvent is dried after application of the adhesive may be a temperature falling within a range of 20 to 140° C. Preferably, the solvent is dried at a temperature which is nearly equal to the boiling point thereof and at which the adhesive-applied product is not adversely affected. When the drying temperature is lower than 20° C., the solvent remains in the resultant laminate film, which may cause poor adhesion or odor, whereas when the drying temperature exceeds 140° C., difficulty is encountered in producing a laminate film having a good appearance, due to, for example, softening of the polymer film. When, for example, the adhesive is applied to a stretched polypropylene film, the drying temperature is preferably 40 to 120° C.

Application of the adhesive may be carried out through any of generally used coating techniques, such as roll coating, spray coating, air-knife coating, dip coating, and coating with a brush. Particularly, roll coating or spray coating is preferably employed.

Lamination processes will now be described in detail. In the dry lamination process, the adhesive is applied to a film material including a base (only a base, or a base on which an inorganic vapor-deposited layer, a coated layer, and another layer are stacked) by means of a roll (e.g., gravure roll), followed by drying of the solvent, and immediately thereafter, an additional film material is attached to the surface of the resultant adhesive layer by means of a nip roll, to thereby produce a laminate film.

In the non-solvent lamination process, the aforementioned adhesive which has been heated to about 40 to about 100° C. in advance is applied to a film material including a base by means of a roll (e.g., gravure roll) which has been heated to 40 to 120° C., and immediately thereafter, an additional film material is attached to the surface of the resultant adhesive layer, to thereby produce a laminate film.

In the extrusion lamination process, a solution prepared by diluting the urethane resin composition (i.e., primary component of the aforementioned adhesive) with an organic solvent is applied, as an adhesive aid (anchor coating agent), to a film material including a base by means of a roll (e.g., gravure roll), followed by drying of the solvent and curing reaction at 20 to 140° C., and then a molten polymer material is laminated to the film material by means of an extruder, to thereby produce a laminate film. The molten polymer material is preferably a polyolefin resin such as low-density polyethylene resin, linear low-density polyethylene resin, and ethylene-vinyl acetate copolymer resin. The aforementioned lamination processes and other generally used lamination processes may optionally be employed in combination. The layer structure of a laminate film may vary with the intended use or form thereof.

According to the present invention (in particular, the second invention), a multi-layer film for packaging materials exhibiting high gas-barrier property can be produced by use of the adhesive for lamination of the present invention without provision of a gas-barrier layer, unlike the case of a conventional multi-layer film for packaging materials, in which a layer having a gas-barrier function must be provided in addition to an adhesive layer applied for adhesion between the gas-barrier layer and a sealant layer. The adhesive of the present invention may be employed for forming an adhesive layer for adhesion between a sealant layer and a conventional gas-barrier layer (e.g., PVDC-coated layer, PVA-coated layer, EVOH film layer, m-xylyleneadipamide film layer, or inorganic (e.g., alumina or silica)-deposited film layer). In such a case, the resultant multi-layer film exhibits considerably improved gas-barrier property.

In the present invention, preferably, aging is optionally carried out at 20 to 60° C. for a certain period of time after lamination, so as to complete curing reaction. Through aging for a certain period of time, a cured product of the urethane resin is produced at a sufficient reaction rate, and high adhesion, gas-barrier property, and flexion resistance are attained. When aging is not carried out or aging is carried out at 20° C. or lower, the reaction rate of the urethane resin composition is reduced, and satisfactory properties may fail to be attained, whereas when aging is carried out at higher than 60° C., problems may arise in terms of, for example, blocking of a polymer film and elution of an additive.

The thickness of an adhesive layer formed through application of the aforementioned adhesive to a film material, etc., followed by drying, attachment, and thermal treatment is 0.1 to 100 μm, preferably 0.5 to 10 μm, from the viewpoint of practical use. When the thickness is less than 0.11 μm, satisfactory adhesion, gas-barrier property, and flexion resistance are difficult to attain, whereas when the thickness exceeds 100%, the thus-formed adhesive layer is difficult to have a uniform thickness.

Optionally, the aforementioned laminate film may be further stacked with, for example, an oxygen-absorbing layer, a thermoplastic resin film layer, a paper layer, or a metal foil layer, to thereby form a layered film. Upon the aforementioned layer stacking, the adhesive of the present invention may be employed, or another adhesive or an anchor coating agent may be employed. The aforementioned laminate film or the aforementioned layered film may be employed as a multi-layer packaging material for protecting foods, drugs, etc. The laminate film of the present invention or a multi-layer film formed by laminating the film on an additional film may be employed for producing the below-described packaging bag.

Coated Film

Any known technique may be employed for production of a coated film by use of the aforementioned coating material containing the composition of the present invention.

When a coated film is produced through application of the aforementioned coating material to a film material, the concentration and temperature of the urethane resin composition are determined so that a coating material layer (cured product layer) is satisfactorily formed. These conditions may vary with selection of the starting materials and application method employed. Specifically, the urethane resin composition concentration may vary with the types and proportions by mole of selected materials, the coating method employed, etc., so as to correspond to, for example, the case where no solvent is employed, or the case where the composition is diluted with an appropriate organic solvent to a concentration of about 5 wt. %, thereby preparing a coating liquid. No particular limitation is imposed on the organic solvent employed, so long as it exhibits solubility in the adhesive. Examples of the organic solvent which may be employed include aromatic hydrocarbons such as toluene and xylene; ketones such as acetone, methyl ethyl ketone, and methyl isobutyl ketone; ethers such as tetrahydrofuran and dioxane; esters such as ethyl acetate and butyl acetate; nitriles such as acetonitrile; and amides such as dimethylformamide and dimethylacetamide. These organic solvents may be employed singly or in combination of two or more species.

Application of the aforementioned coating material may be carried out through any of generally used coating techniques, such as roll coating, spray coating, air-knife coating, dip coating, and coating with a brush. Particularly, roll coating or spray coating is preferably employed. For example, there may be employed a technique and equipment for roll coating or spray coating which is generally used for application of a curable coating component.

The thickness of a coating material layer formed through application of the aforementioned coating material to a film material, etc., followed by drying, attachment, and thermal treatment is 0.01 to 100 μm, preferably 0.5 to 10 μm, from the viewpoint of practical use. When the thickness is less than 0.01 μm, satisfactory gas-barrier property and flexion resistance are difficult to attain, whereas when the thickness exceeds 100 μm, the thus-formed coated layer is difficult to have a uniform thickness.

At least one additional layer (e.g., a flexible polymer film layer, a paper (e.g., carton paper) layer, a metal (e.g., aluminum) foil layer, or an oxygen-absorbing layer) may be stacked on the coating layer (cured product layer) of the coated film produced by use of the aforementioned coating material, to thereby form a layered film. Upon the aforementioned layer stacking, the adhesive of the present invention may be employed, or another adhesive or an anchor coating agent may be employed. The aforementioned coated film or the aforementioned layered film may be employed as a multi-layer packaging material for protecting foods, drugs, etc. The aforementioned coated film or the aforementioned layered film may be employed for producing the below-described packaging bag.

[Packaging Bag]

Next will be described a packaging bag formed of, for example, a soft packaging bag produced from the multi-layer film of the present invention.

The packaging bag formed of, for example, such a soft packaging bag can be produced by overlapping multi-layer films, each having a sealant layer as the outermost layer, so that the sealant layers thereof face each other, and by heat-sealing peripheral edge portions of the thus-overlapped films, thereby forming a sealed portion. For example, there may be employed a bag production method in which the aforementioned multi-layer packaging material is folded up, or the multi-layer packaging materials are overlapped, so that the inner layers thereof face each other, and peripheral edge portions of the thus-folded packaging material or the overlapped packaging materials are heat-sealed, to thereby form a sealed portion (e.g., one-side-sealed type, two-sides-sealed type, three-sides-sealed type, four-sides-sealed type, envelope-sealed type, pillow-sealed type, pleat-sealed type, flat-bottom-sealed type, rectangular-bottom-sealed type, or gusseted type). The form of the packaging bag may vary with the content of the bag, the environmental conditions upon use thereof, or the use pattern thereof. The packaging bag may also be in the form of, for example, self-standing packaging bag (standing pouch). Heat-sealing may be carried out through any known technique, such as bar sealing, rotary roll sealing, belt sealing, impulse sealing, high-frequency sealing, or ultrasonic sealing.

An object of interest is charged into the aforementioned packaging bag through its opening, and then the opening is closed through heat-sealing, to thereby produce a packaged product employing the packaging bag of the present invention. Examples of the content which may be charged into the packaging bag include confectioneries such as rice confectionery, bean confectionery, nuts, biscuit, cookie, wafers, marshmallow, pie, rare cake, candy, and snack; staples such as bread, snack noodle, instant noodle, dried noodle, pasta, sterile packaged cooked rice, rice porridge, rice gruel, packaged rice cake, and cereal foods; agricultural processed foods such as pickle, boiled bean, natto (fermented soybean), miso, frozen tofu, tofu, nametake, konjak, processed wild vegetable products, jams, peanut cream, salad, frozen vegetables, and processed potato products; processed livestock products such as ham, bacon, sausage, processed chicken products, and corned beef; processed marine products such as fish meat ham and sausage, fish paste products, boiled fish paste, toasted layer, soy-boiled foods, dried bonito, salted fish gut, smoked salmon and salted cod roe; fruits such as peach, orange, pineapple, apple, pear, and cherry; vegetables such as corn, asparagus, mushroom, onion, carrot, radish, and potato; cooked foods such as frozen and chilled daily dishes (e.g., hamburger, meat ball, fried sea foods, gyoza (dumpling stuffed with minced pork), and croquette; dairy products such as butter, margarine, cheese, cream, instant creamy powder, and childcare conditioned powdered milk; and other foods such as liquid seasonings, retort curry, and pet foods. The packaging bag can also be employed as a packaging material for, for example, tobaccos, disposable thermal body pads, drugs, and cosmetics.

A multi-layer film formed by use of the adhesive for lamination of the present invention, or a packaging bag produced from the multi-layer film exhibits excellent gas-barrier property, lamination strength, heat seal strength, etc.; specific mechanical, chemical, and physical strengths; and excellent toughness properties (e.g., heat resistance, water resistance, aroma retention property, light resistance, chemical resistance, poking resistance, and other properties). Therefore, according to the present invention, there can be provided a packaging material which sufficiently protects contents charged or packaged therein; for example, foods such as confectioneries, staples, processed agricultural products, processed livestock products, processed marine products, fruits, vegetables, cooked foods (e.g., frozen and chilled daily dishes), dairy products, and liquid seasonings; cosmetics; and drugs, and which exhibits excellent storage/preservation stability, packing/packaging capability, etc.

EXAMPLES

The present invention will next be described in more detail with reference to Examples and Comparative Examples. However, the present invention is not limited to the Examples.

Active Hydrogen Compound Synthesis Example 1

Dipropylene glycol (197.2 g) and trimethylolpropane (56.4 g) were added to a separable flask (inner volume: 0.5 L) equipped with a stirring apparatus, a thermometer, a nitrogen inlet tube, a dropping funnel, and a cooling tube. The flask was heated to 80° C. with stirring under a stream of nitrogen, and m-xylylene diisocyanate (197.6 g) was added dropwise to the flask over two hours. After completion of dropwise addition, reaction was carried out at 80° C. for two hours, to thereby yield 448.5 g of active hydrogen compound A (reaction equivalent ratio: 0.50).

Active Hydrogen Compound Synthesis Example 2

Dipropylene glycol (206.6 g) and trimethylolpropane (59.0 g) were added to a flask similar to that employed in Active Hydrogen Compound Synthesis Example 1. The flask was heated to 80° C. with stirring under a stream of nitrogen, and hexamethylene diisocyanate (185.0 g) was added dropwise to the flask over two hours. After completion of dropwise addition, reaction was carried out at 80° C. for four hours, to thereby yield 448.9 g of active hydrogen compound B (reaction equivalent ratio: 0.50).

Active Hydrogen Compound Synthesis Example 3

An ethylene oxide adduct of aniline (reactant ratio: aniline/ethylene oxide=1/2) (271.9 g) was added to a flask similar to that employed in Active Hydrogen Compound Synthesis Example 1. The flask was heated to 80° C. with stirring under a stream of nitrogen, and m-xylylene diisocyanate (188.2 g) was added dropwise to the flask over two hours. After completion of dropwise addition, reaction was carried out at 80° C. for two hours, to thereby yield 458.2 g of active hydrogen compound C (reaction equivalent ratio: 0.67).

Active Hydrogen Compound Synthesis Example 4

Diethylene glycol (159.2 g), trimethylolpropane (67.1 g), and glycerin (46.1 g) were added to a flask similar to that employed in Active Hydrogen Compound Synthesis Example 1. The flask was heated to 80° C. with stirring under a stream of nitrogen, and m-xylylene diisocyanate (141.1 g) was added dropwise to the flask over two hours. After completion of dropwise addition, reaction was carried out at 80° C. for two hours, to thereby yield 411.8 g of active hydrogen compound D (reaction equivalent ratio: 0.25).

Active Hydrogen Compound Synthesis Example 5

Diethylene glycol (135.3 g), trimethylolpropane (57.0 g), and glycerin (39.1 g) were added to a flask similar to that employed in Active Hydrogen Compound Synthesis Example 1. The flask was heated to 80° C. with stirring under a stream of nitrogen, and m-xylylene diisocyanate (141.1 g) was added dropwise to the flask over two hours. After completion of dropwise addition, reaction was carried out at 80° C. for two hours, to thereby yield 389.4 g of active hydrogen compound E (reaction equivalent ratio: 0.33).

Active Hydrogen Compound Synthesis Example 6

An ethylene oxide adduct of aniline (reactant ratio: aniline/ethylene oxide=1/2) (162.22 g), trimethylolpropane (20.13 g), and ethyl acetate (100.00 g) were added to a separable flask (inner volume: 0.5 L) equipped with a stirring apparatus, a thermometer, a nitrogen inlet tube, and a cooling tube. The flask was heated to 80° C. with stirring under a stream of nitrogen, and m-xylylene diisocyanate (141.14 g) was added dropwise to the flask over two hours. After completion of dropwise addition, reaction was carried out at 80° C. for three hours, and then the reaction mixture was diluted with ethyl acetate (38.63 g), to thereby yield 460.86 g of active hydrogen compound F (solid content: 70.00) (reaction equivalent ratio: 0.67).

Active Hydrogen Compound Synthesis Example 7

Dipropylene glycol (163.02 g) and ethyl acetate (100.00 g) were added to a flask similar to that employed in Active Hydrogen Compound Synthesis Example 6. The flask was heated to 80° C. with stirring under a stream of nitrogen, and m-xylylene diisocyanate (169.36 g) was added dropwise to the flask over two hours. After completion of dropwise addition, reaction was carried out at 80° C. for four hours, and then trimethylolpropane (12.08 g) was added to the reaction mixture. Subsequently, the resultant mixture was diluted with ethyl acetate (32.62 g), to thereby yield 475.22 g of active hydrogen compound G (solid content: 72.3%) (reaction equivalent ratio: 0.67).

Active Hydrogen Compound Synthesis Example 8

Dipropylene glycol (128.2 g) and trimethylolpropane (36.6 g) were added to a flask similar to that employed in Active Hydrogen Compound Synthesis Example 6. The flask was heated to 80° C. with stirring under a stream of nitrogen, and m-xylylene diisocyanate (197.6 g) was added dropwise to the flask over two hours. After completion of dropwise addition, reaction was carried out at 80° C. for two hours, to thereby yield 361.0 g of active hydrogen compound H (reaction equivalent ratio: 0.77).

Organic Polyisocyanate Compound Synthesis Example 1 m-Xylylene diisocyanate (3010.9 g) was added to a separable flask (inner volume: 5.0 L) equipped with a stirring apparatus, a thermometer, a nitrogen inlet tube, a dropping funnel, and a cooling tube. The flask was heated to 80° C. with stirring under a stream of nitrogen, and a polyol mixture (438.5 g) (diethylene glycol (212.2 g), trimethylolpropane (134.2 g), and glycerin (92.1 g)) was added dropwise to the flask over four hours (reaction equivalent ratio: 3.2). After completion of dropwise addition, the reaction mixture was stirred at 80° C. for two hours, and then applied to a thin-film distillation apparatus (0.03 m$^2$) under the following conditions (vacuum: 1.0 Torr, distillation temperature: 180° C., feed rate: 5 g/min), to thereby yield 1642.7 g of organic polyisocyanate compound A (remaining m-xylylene diisocyanate: 0.6 wt. %).

Organic Polyisocyanate Compound Synthesis Example 2 m-Xylylene diisocyanate (3387.2 g) was added to a flask similar to that employed in Organic Polyisocyanate Compound Synthesis Example 1. The flask was heated to 80° C. with stirring under a stream of nitrogen, and trimethylolpropane (402.5 g) was added dropwise to the flask over four hours (reaction equivalent ratio: 4.0). After completion of dropwise addition, the reaction mixture was stirred at 80° C. for two hours, and then applied to a thin-film distillation apparatus (0.03 m$^2$) under the following conditions (vacuum: 1.0 Torr, distillation temperature: 180° C., feed rate: 5 g/min), to thereby yield 1781.2 g of organic polyisocyanate compound B (remaining m-xylylene diisocyanate: 0.9 wt. %).

Organic Polyisocyanate Compound Synthesis Example 3

Hexamethylene diisocyanate (3027.4 g) was added to a flask similar to that employed in Organic Polyisocyanate Compound Synthesis Example 1. The flask was heated to 80° C. with stirring under a stream of nitrogen, and trimethylolpropane (402.5 g) was added dropwise to the flask over four hours (reaction equivalent ratio: 4.0). After completion of dropwise addition, the reaction mixture was stirred at 80° C. for two hours, and then applied to a thin-film distillation apparatus (0.03 m$^2$) under the following conditions (vacuum: 1.0 Torr, distillation temperature: 180° C., feed rate: 5 g/min), to thereby yield 1653.2 g of organic polyisocyanate compound C (remaining hexamethylene diisocyanate: 0.3 wt. %).

Organic Polyisocyanate Compound Synthesis Example 4

Tolylene diisocyanate (3134.9 g) was added to a flask similar to that employed in Organic Polyisocyanate Compound Synthesis Example 1. The flask was heated to 80° C. with stirring under a stream of nitrogen, and trimethylolpropane (402.5 g) was added dropwise to the flask over four hours (reaction equivalent ratio: 4.0). After completion of dropwise addition, the reaction mixture was stirred at 80° C. for two hours, and then applied to a thin-film distillation apparatus (0.03 m$^2$) under the following conditions (vacuum: 1.0 Torr, distillation temperature: 180° C., feed rate: 5 g/min), to thereby yield 1691.2 g of organic polyisocyanate compound D (remaining tolylene diisocyanate: 0.7 wt. %).

Organic Polyisocyanate Compound Synthesis Example 5

1,3-Bis(isocyanatomethyl)cyclohexane (3496.1 g) was added to a flask similar to that employed in Organic Polyisocyanate Compound Synthesis Example 1. The flask was heated to 80° C. with stirring under a stream of nitrogen, and trimethylolpropane (402.5 g) was added dropwise to the flask over four hours (reaction equivalent ratio: 4.0). After completion of dropwise addition, the reaction mixture was stirred at 80° C. for two hours, and then applied to a thin-film distillation apparatus (0.03 m$^2$) under the following conditions (vacuum: 1.0 Torr, distillation temperature: 180° C., feed rate: 5 g/min), to thereby yield 1835.7 g of organic polyisocyanate compound E (remaining 1,3-bis(isocyanatomethyl)cyclohexane: 0.4 wt. %).

Organic Polyisocyanate Compound Synthesis Example 6

Isophorone diisocyanate (4001.04 g) was added to a flask similar to that employed in Organic Polyisocyanate Compound Synthesis Example 4. The flask was heated to 80° C. with stirring under a stream of nitrogen, and trimethylolpropane (402.5 g) was added dropwise to the flask over four hours (reaction equivalent ratio: 4.0). After completion of dropwise addition, the reaction mixture was stirred at 80° C. for two hours, and then applied to a thin-film distillation apparatus (0.03 m$^2$) under the following conditions (vacuum: 1.0 Torr, distillation temperature: 180° C., feed rate: 5 g/min), to thereby yield 2022.2 g of organic polyisocyanate compound F (remaining isophorone diisocyanate: 0.4 wt. %).

Gas-barrier property, flexion resistance, lamination strength, and content resistance were evaluated through the following methods.

Gas-Barrier Property

Examples 1 to 15 and Comparative Examples 1 to 12

The oxygen permeability (mL/m$^2$·day·MPa) of a laminate film was determined by means of an oxygen permeability measuring apparatus (8001 Oxygen Permeation Analyzer, product of Illinois Instruments, Inc.) at 23° C. and a relative humidity of 60%.

Example 16 and Comparative Examples 13 to 15

The oxygen permeability coefficient of an adhesive layer was calculated, by using the below-described formula, from the oxygen permeabilities of a base and a sealant film as determined under the aforementioned conditions, and the above-determined oxygen permeability of the laminate film.

$1/R_1=1/R_2+1/R_3+DFT/P$ $R_1$: oxygen permeability of laminate film (cc/m$^2$·day·atm)
$R_2$: oxygen permeability of base (cc/m$^2$·day·atm)
$R_3$: oxygen permeability of sealant (cc/m$^2$·day·atm)
DFT: thickness of adhesive layer (mm)
P: oxygen permeability coefficient of adhesive layer (cc·mm/m$^2$·day·atm)

<Flexion Resistance>

A laminate film was subjected to 360°-twisting 50 times by means of Gelbo Flex Tester (product of Rigaku Kogyo). The oxygen permeability (mL/m$^2$·day·MPa) of the laminate film (after the Gelbo treatment) was determined at 23° C. and a relative humidity of 60%. The thus-determined oxygen permeability was compared with the oxygen permeability of an untreated laminate film.

<Lamination Strength (g/15 mm)>

The strength of a laminate film was determined through a T-type peeling test (peeling speed: 300 mm/min) according to the method specified in JIS K-6854. When a laminated portion was not peeled, and a base film itself was broken, evaluation was terminated at the time when such breakage occurred.

<Content Resistance>

For evaluation of content resistance, a mixture (50 g) of vinegar, ketchup, and salad oil (1:1:1 by weight) was charged into a bag formed from a laminate film (10×15 cm, four-sides sealed (width of sealed portion: 1 cm)); the bag was stored at 40° C. for two weeks; and then the lamination strength of the film was determined. The higher the percent strength retention (lamination strength after storage/initial lamination strength), the better the content resistance.

Example 1

Active hydrogen compound A (100 parts by weight) was mixed with organic polyisocyanate compound A (157 parts by weight), and the mixture was diluted with ethyl acetate (solvent) so as to attain a solid content of 35 wt. %. An acrylic humectant (BYK-381, product of BYK-Chemie) (0.02 parts by weight) was added to the mixture, and the resultant mixture was thoroughly stirred, to thereby prepare an adhesive. The adhesive was applied to the deposition surface of an aluminum-deposited polyethylene terephthalate film having a thickness of 12 μm (MLPET, product of Tohcello Co., Ltd.) serving as a base by means of a bar coater (No. 8), followed by drying at 85° C. for 15 seconds. Subsequently, a linear polyethylene film having a thickness of 40 μm (T.U.X.MC-S, product of Tohcello Co., Ltd.) serving as a sealant was attached to the adhesive-applied film by means of a nip roll, and then aging was carried out at 50° C. for two days, to thereby produce a laminate film. The evaluation results of the laminate film are shown in Table 1.

Example 2

The procedure of Example 1 was repeated, except that active hydrogen compound A was replaced with active hydrogen compound B (100 parts by weight), and organic polyisocyanate compound A was employed in an amount of 164 parts by weight, to thereby produce a laminate film. The evaluation results of the laminate film are shown in Table 1.

Example 3

The procedure of Example 1 was repeated, except that active hydrogen compound A was replaced with active hydrogen compound C (100 parts by weight), and organic polyisocyanate compound A was employed in an amount of 73 parts by weight, to thereby produce a laminate film. The evaluation results of the laminate film are shown in Table 1.

Example 4

The procedure of Example 1 was repeated, except that organic polyisocyanate compound A was replaced with organic polyisocyanate compound B (145 parts by weight), to thereby produce a laminate film. The evaluation results of the laminate film are shown in Table 1.

Example 5

The procedure of Example 1 was repeated, except that organic polyisocyanate compound A was replaced with organic polyisocyanate compound C (148 parts by weight), to thereby produce a laminate film. The evaluation results of the laminate film are shown in Table 1.

Example 6

The procedure of Example 1 was repeated, except that active hydrogen compound A was replaced with active hydrogen compound B (100 parts by weight), and organic polyisocyanate compound A was replaced with organic polyisocyanate compound B (152 parts by weight), to thereby produce a laminate film. The evaluation results of the laminate film are shown in Table 1.

Example 7

The procedure of Example 1 was repeated, except that active hydrogen compound A was replaced with active hydrogen compound B (100 parts by weight), and organic polyisocyanate compound A was replaced with organic polyisocyanate compound C (155 parts by weight), to thereby produce a laminate film. The evaluation results of the laminate film are shown in Table 1.

Example 8

The procedure of Example 1 was repeated, except that active hydrogen compound A was replaced with active hydrogen compound D (100 parts by weight); organic polyisocyanate compound A was employed in an amount of 396 parts by weight; and acetone was employed as a solvent in place of ethyl acetate, to thereby produce a laminate film. The evaluation results of the laminate film are shown in Table 1.

Example 9

The procedure of Example 1 was repeated, except that active hydrogen compound A was replaced with active hydrogen compound E (100 parts by weight); organic polyisocyanate compound A was employed in an amount of 315 parts by weight; and acetone was employed as a solvent in place of ethyl acetate, to thereby produce a laminate film. The evaluation results of the laminate film are shown in Table 1.

Comparative Example 1

The procedure of Example 1 was repeated, except that organic polyisocyanate compound A was replaced with organic polyisocyanate compound D (150 parts by weight), to thereby produce a laminate film. The evaluation results of the laminate film are shown in Table 1.

Comparative Example 2

The procedure of Example 1 was repeated, except that organic polyisocyanate compound A was replaced with organic polyisocyanate compound E (162 parts by weight), to thereby produce a laminate film. The evaluation results of the laminate film are shown in Table 1.

Comparative Example 3

The procedure of Example 1 was repeated, except that organic polyisocyanate compound A was replaced with organic polyisocyanate compound F (184 parts by weight), to thereby produce a laminate film. The evaluation results of the laminate film are shown in Table 1.

Comparative Example 4

An ethylene oxide adduct of m-xylylenediamine (reactant ratio by mole: m-xylylenediamine/ethylene oxide=1/4) (Blaunon EO4, product of Aoki Oil Industrial Co., Ltd.) (100 parts by weight) was mixed with organic polyisocyanate compound A (432 parts by weight), and the mixture was diluted with a solvent mixture of acetone/ethyl acetate (ratio by weight: 1/0.3) so as to attain a solid content of 35 wt. %. An acrylic humectant (BYK-381, product of BYK-Chemie) (0.04 parts by weight) was added to the mixture, and the resultant mixture was thoroughly stirred, to thereby prepare an adhesive. The adhesive was applied to the deposition surface of an aluminum-deposited polyethylene terephthalate film having a thickness of 12 μm (MLPET, product of Tohcello Co., Ltd.) by means of a bar coater (No. 8), followed by drying at 85° C. for 15 seconds. Subsequently, a linear polyethylene film having a thickness of 40 μm (T.U.X.MC-S, product of Tohcello Co., Ltd.) was attached to the adhesive-applied film by means of a nip roll, and then aging was carried out at 50° C. for two days, to thereby produce a laminate film. The evaluation results of the laminate film are shown in Table 1.

TABLE 1

| | Oxygen permeability ($mL/m^2 \cdot day \cdot MPa$) | | Lamination strength (g/15 mm) |
|---|---|---|---|
| | Before Gelbo treatment | After Gelbo treatment | |
| Example 1 | 4 | 12 | 250 f* |
| Example 2 | 5 | 24 | 250 f* |
| Example 3 | 5 | 16 | 250 f* |
| Example 4 | 5 | 10 | 250 f* |
| Example 5 | 6 | 21 | 250 f* |
| Example 6 | 6 | 18 | 250 f* |
| Example 7 | 5 | 38 | 250 f* |
| Example 8 | 5 | 18 | 250 f* |
| Example 9 | 5 | 13 | 250 f* |
| Comparative Example 1 | 10 | 160 | 10 |
| Comparative Example 2 | 12 | 174 | 10 |
| Comparative Example 3 | 18 | 242 | 10 |
| Comparative Example 4 | 5 | 13 | 90 |

*f: breakage of film base

Example 10

Active hydrogen compound F (100 parts by weight) was mixed with organic polyisocyanate compound A (70 parts by weight), and ethyl acetate (170 parts by weight) was added to the mixture so as to attain a solid content of 35 wt. %. An acrylic humectant (BYK-381, product of BYK-Chemie) (0.04 parts by weight) was added to the mixture, and the resultant mixture was thoroughly stirred until the mixture was formed into a uniform solution, to thereby prepare an adhesive. The adhesive was applied to a corona-treated surface of a polyethylene terephthalate film having a thickness of 12 with (E-5100, product of Toyobo Co., Ltd.) serving as a base by means of a bar coater (No. 8), followed by drying at 85° C. for 15 seconds. Subsequently, a linear polyethylene film having a thickness of 40 μm (T.U.X.MC-S, product of Tohcello Co., Ltd.) serving as a sealant was attached to the adhesive-applied film by means of a nip roll, and then aging was carried out at 40° C. for three days, to thereby produce a laminate film. The evaluation results of the laminate film are shown in Table 2.

Example 11

The procedure of Example 10 was repeated, except that active hydrogen compound F was replaced with active hydrogen compound G (100 parts by weight); organic polyisocyanate compound A was employed in an amount of 57 parts by weight; and ethyl acetate was employed in an amount of 214 parts by weight, to thereby produce a laminate film. The evaluation results of the laminate film are shown in Table 2.

Example 12

The procedure of Example 10 was repeated, except that organic polyisocyanate compound A was replaced with organic polyisocyanate compound B (51 parts by weight), and ethyl acetate was employed in an amount of 195 parts by weight, to thereby produce a laminate film. The evaluation results of the laminate film are shown in Table 2.

Example 13

The procedure of Example 10 was repeated, except that active hydrogen compound F was replaced with active hydrogen compound G (100 parts by weight); organic polyisocyanate compound A was replaced with organic polyisocyanate compound B (60 parts by weight); and ethyl acetate was employed in an amount of 218 parts by weight, to thereby produce a laminate film. The evaluation results of the laminate film are shown in Table 2.

Example 14

The procedure of Example 10 was repeated, except that active hydrogen compound F was replaced with active hydrogen compound H (100 parts by weight); organic polyisocyanate compound A was employed in an amount of 63 parts by weight; and ethyl acetate was employed in an amount of 247 parts by weight, to thereby produce a laminate film. The evaluation results of the laminate film are shown in Table 2.

Example 15

The procedure of Example 10 was repeated, except that E-5100 was replaced with an alumina-deposited polyethylene terephthalate film having a thickness of 12 μm (Barrialox 1031HG, product of Toray Advanced Film Co., Ltd.), and the adhesive was applied to the alumina-deposited surface of the film, to thereby produce a laminate film. The evaluation results of the laminate film are shown in Table 3.

Example 16

The procedure of Example 11 was repeated, except that E-5100 was replaced with an alumina-deposited polyethylene terephthalate film having a thickness of 12 μm (Barrialox 1031HG, product of Toray Advanced Film Co., Ltd.), and the adhesive was applied to the alumina-deposited surface of the film, to thereby produce a laminate film. The evaluation results of the laminate film are shown in Table 3.

Example 17

The procedure of Example 12 was repeated, except that E-5100 was replaced with an alumina-deposited polyethylene terephthalate film having a thickness of 12 μm (Barrialox 1031HG, product of Toray Advanced Film Co., Ltd.), and the adhesive was applied to the alumina-deposited surface of the film, to thereby produce a laminate film. The evaluation results of the laminate film are shown in Table 3.

Example 18

The procedure of Example 13 was repeated, except that E-5100 was replaced with an alumina-deposited polyethylene terephthalate film having a thickness of 12 μm (Barrialox 1031HG, product of Toray Advanced Film Co., Ltd.), and the adhesive was applied to the alumina-deposited surface of the film, to thereby produce a laminate film. The evaluation results of the laminate film are shown in Table 3.

Example 19

The procedure of Example 14 was repeated, except that E-5100 was replaced with an alumina-deposited polyethylene terephthalate film having a thickness of 12 μm (Barrialox 1031HG, product of Toray Advanced Film Co., Ltd.), and the adhesive was applied to the alumina-deposited surface of the film, to thereby produce a laminate film. The evaluation results of the laminate film are shown in Table 3.

Comparative Example 5

The procedure of Example 10 was repeated, except that organic polyisocyanate compound A was replaced with organic polyisocyanate compound D (67 parts by weight), and ethyl acetate was employed in an amount of 254 parts by weight, to thereby produce a laminate film. The evaluation results of the laminate film are shown in Table 2.

Comparative Example 6

The procedure of Example 10 was repeated, except that organic polyisocyanate compound A was replaced with organic polyisocyanate compound E (72 parts by weight), and ethyl acetate was employed in an amount of 263 parts by weight, to thereby produce a laminate film. The evaluation results of the laminate film are shown in Table 2.

Comparative Example 7

The procedure of Example 10 was repeated, except that organic polyisocyanate compound A was replaced with organic polyisocyanate compound F (82 parts by weight), and ethyl acetate was employed in an amount of 282 parts by weight, to thereby produce a laminate film. The evaluation results of the laminate film are shown in Table 2.

Comparative Example 8

The procedure of Comparative Example 5 was repeated, except that E-5100 was replaced with an alumina-deposited polyethylene terephthalate film having a thickness of 12 μm (Barrialox 1031HG, product of Toray Advanced Film Co., Ltd.), and the adhesive was applied to the alumina-deposited surface of the film, to thereby produce a laminate film. The evaluation results of the laminate film are shown in Table 3.

Comparative Example 9

The procedure of Comparative Example 6 was repeated, except that E-5100 was replaced with an alumina-deposited polyethylene terephthalate film having a thickness of 12 μm (Barrialox 1031HG, product of Toray Advanced Film Co., Ltd.), and the adhesive was applied to the alumina-deposited surface of the film, to thereby produce a laminate film. The evaluation results of the laminate film are shown in Table 3.

Comparative Example 10

The procedure of Comparative Example 7 was repeated, except that E-5100 was replaced with an alumina-deposited polyethylene terephthalate film having a thickness of 12 μm (Barrialox 1031HG, product of Toray Advanced Film Co., Ltd.), and the adhesive was applied to the alumina-deposited surface of the film, to thereby produce a laminate film. The evaluation results of the laminate film are shown in Table 3.

[Table 2]

TABLE 2

|  | Oxygen permeability cc/ $m^2 \cdot day \cdot atm$ | oxygen permeability coefficient cc · mm/ $m^2 \cdot day \cdot atm$ | Thickness μm | Lamination strength g/15 mm | Content resistance g/15 mm (strength retention %) |
|---|---|---|---|---|---|
| Example 10 | 12.0 | 0.050 | 3.8 | 820 | 830 (101) |
| Example 11 | 11.5 | 0.053 | 4.2 | 800 | 790 (99) |
| Example 12 | 16.0 | 0.071 | 3.9 | 750 | 750 (100) |
| Example 13 | 15.7 | 0.071 | 4.0 | 710 | 700 (99) |
| Example 14 | 17.3 | 0.080 | 4.0 | 700 | 680 (97) |
| Comparative Example 5 | 75.4 | 0.648 | 3.6 | <10 | Not evaluated |
| Comparative Example 6 | 82.0 | 0.758 | 3.4 | <10 | Not evaluated |
| Comparative Example 7 | 112.8 | 3.316 | 3.6 | <10 | Not evaluated |

TABLE 3

|  | Oxygen permeability cc/$m^2$ · day · atm | Lamination strength g/15 mm | Content resistance g/15 mm (strength retention %) |
|---|---|---|---|
| Example 15 | 1.4 | 720 | 710 (99) |
| Example 16 | 1.4 | 680 | 700 (103) |
| Example 17 | 1.6 | 640 | 600 (94) |
| Example 18 | 1.6 | 650 | 620 (95) |
| Example 19 | 1.6 | 660 | 680 (103) |
| Comparative Example 8 | 1.4 | <10 | Not evaluated |

TABLE 3-continued

|  | Oxygen permeability cc/$m^2$ · day · atm | Lamination strength g/15 mm | Content resistance g/15 mm (strength retention %) |
|---|---|---|---|
| Comparative Example 9 | 1.7 | <10 | Not evaluated |
| Comparative Example 10 | 1.3 | <10 | Not evaluated |

Example 20

Active hydrogen compound G (100 parts by weight) was mixed with organic polyisocyanate compound A (56 parts by weight), and ethyl acetate (199 parts by weight) was added to the mixture so as to attain a solid content of 35 wt. %. An acrylic humectant (BYK-381, product of BYK-Chemie) (0.04 parts by weight) and cobalt naphthenate (0.76 parts by weight) were added to the mixture, and the resultant mixture was thoroughly stirred until the mixture was formed into a uniform solution, to thereby prepare an adhesive. The adhesive was applied to a corona-treated surface of a nylon film having a thickness of 15 μm (SPR-R, product of Mitsubishi Plastics, Inc.) serving as a base by means of a bar coater (No. 8), followed by drying at 85° C. for 15 seconds. Subsequently, a linear polyethylene film having a thickness of 40 μm (T.U.X.MC-S, product of Tohcello Co., Ltd.) serving as a sealant was attached to the adhesive-applied film by means of a nip roll, and then aging was carried out at 40° C. for three days, to thereby produce a laminate film. The evaluation results of the laminate film are shown in Table 4.

Example 21

The procedure of Example 20 was repeated, except that cobalt naphthenate was not added, to thereby produce a laminate film. The evaluation results of the laminate film are shown in Table 4.

TABLE 4

|  | Oxygen permeability cc/ $m^2 \cdot day \cdot atm$ | oxygen permeability coefficient cc · mm/ $m^2 \cdot day \cdot atm$ | Thickness μm | Lamination strength (initial) g/15 mm | Lamination strength (4 months later) g/15 mm |
|---|---|---|---|---|---|
| Example 20 | 3.95 | 0.031 | 4.1 | 640 | 600 |
| Example 21 | 5.51 | 0.068 | 3.8 | 590 | 570 |

Comparative Example 11

Dipropylene glycol (170.5 g) and trimethylolpropane (9.4 g) were added to a flask similar to that employed in Active Hydrogen Compound Synthesis Example 1. The flask was heated to 80° C. with stirring under a stream of nitrogen, and m-xylylene diisocyanate (178.8 g) was added dropwise to the flask over two hours. After completion of dropwise addition, reaction was carried out at 80° C. for two hours, to thereby yield 356.5 g of active hydrogen compound I (reaction equivalent ratio: 0.91). Active hydrogen compound I exhibited low solubility in ethyl acetate or acetone, and thus failed to be evaluated as an adhesive.

Industrial Applicability

The present invention is preferably applied to a polyurethane resin composition which is suitable for use in a packaging material for, for example, foods or drugs for the purpose of preserving contents thereof by preventing penetration therethrough by various gases (e.g., oxygen, water vapor, and aroma components); to an adhesive or coating material containing the resin composition; and to a multi-layer film or packaging bag containing such an adhesive or coating material.

The invention claimed is:

1. A polyurethane resin composition comprising an active hydrogen compound (A) formed by adding m-xylylene diisocyanate and/or hexamethylene diisocyanate to a compound (C) at a reaction equivalent ratio of [the number of isocyanate groups]/[the number of hydroxyl groups] of 0.80 to 0.10; and an organic polyisocyanate compound (B) formed by adding a compound (D) to m-xylylene diisocyanate and/or hexamethylene diisocyanate at a reaction equivalent ratio of [the number of isocyanate groups]/[the number of hydroxyl groups] of 2 to 10, wherein the compound (C) is at least one compound selected from among ethylene glycol, 1,3-propanediol, propylene glycol, diethylene glycol, dipropylene glycol, m-xylylene glycol, trimethylolpropane, glycerin, an ethylene oxide adduct of aniline, a propylene oxide adduct of aniline, an ethylene oxide adduct of m-xylylenediamine, and a propylene oxide adduct of m-xylylenediamine; and the compound (D) is at least one compound selected from among ethylene glycol, 1,3-propanediol, propylene glycol, diethylene glycol, dipropylene glycol, m-xylylene glycol, trimethylolpropane, glycerin, an ethylene oxide adduct of aniline, a propylene oxide adduct of aniline, an ethylene oxide adduct of m-xylylenediamine, and a propylene oxide adduct of m-xylylenediamine;

and the ratio of the total hydroxyl groups originating from a compound(s) having three or more hydroxyl functionalities to the total hydroxyl groups of the compound (C) is 5% or more and less than 70%.

2. The resin composition according to claim 1, wherein the active hydrogen compound (A) is an active hydrogen compound formed by adding m-xylylene diisocyanate and/or hexamethylene diisocyanate to the compound (C) at a reaction equivalent ratio of [the number of isocyanate groups]/[the number of hydroxyl groups] of 0.75 to 0.10.

3. The resin composition according to claim 1, wherein the active hydrogen compound (A) is an active hydrogen compound formed by adding m-xylylene diisocyanate to the compound (C) at a reaction equivalent ratio of [the number of isocyanate groups]/[the number of hydroxyl groups] of 0.80 to 0.35; and the organic polyisocyanate compound (B) is an organic polyisocyanate formed by adding the compound (D) to m-xylylene diisocyanate at a reaction equivalent ratio of [the number of isocyanate groups]/[the number of hydroxyl groups] of 2 to 10.

4. The resin composition according to claim 3, which contains at least one metal element selected from the group consisting of transition metals belonging to Groups 8, 9, and 10 of the periodic table, manganese, copper, and zinc.

5. The polyurethane resin composition according to claim 4, which contains the metal element in an amount of 10 to 5,000 ppm.

6. The polyurethane resin composition according to claim 4, wherein the metal element is contained in at least one compound selected from a carboxylate thereof, a halide thereof, and an acetylacetonato complex thereof.

7. The polyurethane resin composition according to claim 4, wherein the metal element is contained in at least one compound selected from cobalt acetate, cobalt naphthenate, cobalt oleate, and a cobalt acetylacetonato complex.

8. The resin composition according to claim 1, wherein compound (C) comprises at least one member selected from the group consisting of propylene glycol, dipropylene glycol, trimethylolpropane, an ethylene oxide adduct of aniline, a propylene oxide adduct of aniline, and a propylene oxide adduct of m-xylylenediamine, wherein the ratio of the number of hydroxyl groups originating from these recited compounds to the number of all the hydroxyl groups of the compound (C) is 50% or more.

9. The resin composition according to claim 1, wherein the ratio of the total hydroxyl groups originating from a compound(s) having three or more hydroxyl functionalities to the total hydroxyl groups of the compound (D) is 5% or more and less than 80%.

10. The polyurethane resin composition according to claim 1, which is a two-component type composition formed of the active hydrogen compound (A) and the organic polyisocyanate compound (B).

11. A polyurethane adhesive containing a resin composition as recited in claim 1.

12. A polyurethane coating material containing a resin composition as recited in claim 1.

13. A multi-layer film having a cured product layer formed from a resin composition as recited in claim 1.

14. The multi-layer film according to claim 13, which has a sealant layer.

15. A packaging bag produced by overlapping multi-layer films as recited in claim 14 so that sealant layers thereof face each other, and heat-sealing peripheral edge portions of the overlapped films, thereby forming a sealed portion.

16. The multi-layer film according to claim 13, which has an inorganic vapor-deposited layer.

17. The multi-layer film according to claim 16, which has a structure in which the metal foil layer is in contact with the cured product layer.

18. The multi-layer film according to claim 16, wherein the inorganic vapor-deposited layer is formed of at least one species selected from among aluminum, alumina, and silica.

19. The multi-layer film according to claim 13, which has a metal foil layer.

20. The multi-layer film according to claim 19, which has a structure in which the metal foil layer is in contact with the cured product layer.

21. The multi-layer film according to claim 19, wherein the metal foil layer is made of aluminum foil.

22. The resin composition according to claim 1, wherein the ratio of the total hydroxyl groups originating from a compound(s) having three or more hydroxyl functionalities to the total hydroxyl groups of the compound (D) is less than 80%.

* * * * *